Patented Mar. 31, 1925.

1,532,020

UNITED STATES PATENT OFFICE.

ANGELOS D. ANGELIDES, OF LONG BEACH, CALIFORNIA.

FORK FOR TABLE USE.

Application filed November 2, 1923. Serial No. 672,295.

*To all whom it may concern:*

Be it known that I, ANGELOS D. ANGE-LIDES, a citizen of Greece, residing at Long Beach, in the county of Los Angeles and State of California, have invented new and useful Improvements in Forks for Table Use, of which the following is a specification.

This invention relates to table ware and has for its object to provide an improved fork.

Other objects and advantages will be made manifest in the following specification of an embodiment of the invention illustrated in the accompanying drawing, wherein.

Figure 1:
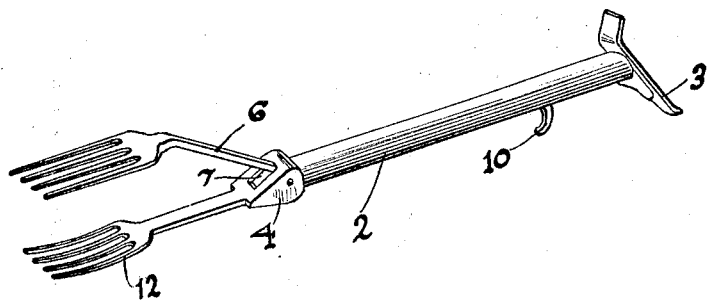
Figure 1 is a perspective of the fork with the fork members separating in normal open position.
Figure 2:
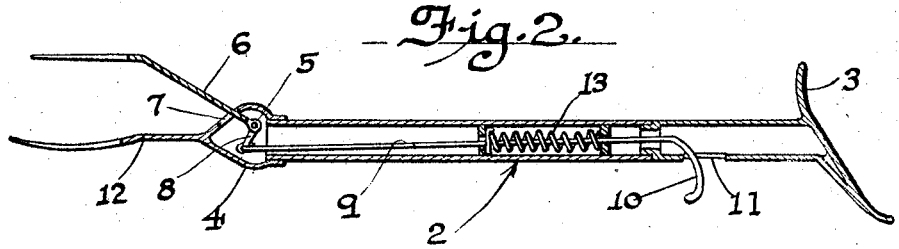
Figure 2 is a sectional view.

The invention consists of a tubular handle 2 at one end of which is formed a palm rest 3 to rest under the thumb of the hand. One end of the handle 2 is provided with a chamber 4 and in this is a rock-shaft 5 carrying a lever arm 6 projecting through a slot 7 in the shell 4. There is a crank arm 8 attached to the rock-shaft and this is connected to a link 9 extending back through the handle 2 and having a finger clip 10 which projects through a slot 11 in the handle.

From the shell 4 extends a rigid fork 12.

When the instrument is gripped in the handle the trigger 10 can be pulled back and this will close the swinging fork 6 toward the fixed fork 12 so as to engage any food substance or other material as may be desired.

A spring 13 is enclosed in the handle and is operative to pull the link 9 in a direction to open the fork 6.

Further embodiments, modifications and variations may be resorted to within the spirit of my invention.

What is claimed is:

1. A table fork comprising a tubular handle, a palm rest at one end of the tubular handle, means forming a chamber at the opposite end of the tubular handle from the palm rest, a rock shaft mounted transversely of the chamber means and extending through the chamber, a lever arm extending from the rock shaft through a slot in the chamber means, a crank arm extending from the rock shaft at right angles to the lever arm, a link connected to the crank arm and extending through the tubular handle part way to the palm rest, a finger clip upon the link and extending through a slot in the handle, a rigid fork member extending straight from the chamber means, and a swinging fork member extending from the lever arm above the rigid fork member.

2. A table fork comprising a tubular handle, a palm rest at one end of the tubular handle, means forming a chamber at the opposite end of the tubular handle from the palm rest, a rock shaft mounted transversely of the chamber means and extending through the chamber, a lever arm extending from the rock shaft through a slot in the chamber means, a crank arm extending from the rock shaft at right angles to the lever arm, a link connected to the crank arm and extending through the tubular handle part way to the palm rest, a finger clip upon the link and extending through a slot in the handle, a rigid fork member extending from the chamber means, a swinging fork member extending from the lever arm, and a spring mounted in the tubular handle and adapted to push upon the link to move the swinging fork away from the rigid fork.

In testimony whereof I have signed my name to this specification.

ANGELOS D. ANGELIDES.